(12) United States Patent
Muto et al.

(10) Patent No.: US 11,786,992 B2
(45) Date of Patent: Oct. 17, 2023

(54) METHOD OF MANUFACTURING MOLDED PRODUCT AND MOLDED PRODUCT

(71) Applicant: FUTABA INDUSTRIAL CO., LTD., Okazaki (JP)

(72) Inventors: Shota Muto, Okazaki (JP); Keigo Yasuda, Okazaki (JP); Koji Yamaguchi, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 70 days.

(21) Appl. No.: 17/150,583

(22) Filed: Jan. 15, 2021

(65) Prior Publication Data
US 2021/0283715 A1    Sep. 16, 2021

(30) Foreign Application Priority Data
Mar. 13, 2020 (JP) .................................. 2020-044250

(51) Int. Cl.
*B23K 26/26* (2014.01)
*B23K 10/02* (2006.01)
(Continued)

(52) U.S. Cl.
CPC ............ *B23K 26/26* (2013.01); *B21D 35/007* (2013.01); *B23K 10/02* (2013.01); *B23K 26/0093* (2013.01); *B23K 26/21* (2015.10)

(58) Field of Classification Search
CPC .... B21D 22/208; B21D 35/007; B23K 26/22; B23K 26/26; B23K 26/28; B23K 26/0093;
(Continued)

(56) References Cited

U.S. PATENT DOCUMENTS

2014/0147693 A1    5/2014    Yasuyama et al.
2019/0010570 A1 *  1/2019    Suzuki ................. B21D 35/007
(Continued)

FOREIGN PATENT DOCUMENTS

CN    110582359 A    12/2019
JP    2000197969 A    7/2000
(Continued)

OTHER PUBLICATIONS

Notice of Reasons for Refusal (Office Action) for Japanese Patent Application No. 2020-044250 dated Jan. 18, 2022, 4 pages including English translation.
(Continued)

*Primary Examiner* — John J Norton
*Assistant Examiner* — Simpson A Chen
(74) *Attorney, Agent, or Firm* — Withrow & Terranova, P.L.L.C.; Vincent K. Gustafson

(57) ABSTRACT

Provided is a method of manufacturing a molded product that can reduce problems on a reinforcing plate during pressing. In one aspect of the present disclosure, the method of manufacturing a molded product includes welding a first metal plate overlaid with a second metal plate to the second metal plate; and pressing the first metal plate and the second metal plate together. In the pressing, a base surface and a wall surface are formed on the first metal plate; the wall surface is disposed to cross the base surface. In the welding, a first welding is performed on a reinforcing portion of the second metal plate that is overlaid on an area of the first metal plate that is formed into the wall surface; and subsequently, a second welding is performed in a direction crossing a direction of the first welding.

5 Claims, 5 Drawing Sheets

(51) Int. Cl.
  *B23K 26/00* (2014.01)
  *B21D 35/00* (2006.01)
  *B23K 26/21* (2014.01)

(58) Field of Classification Search
  CPC  B23K 2101/18; B23K 2103/04; B23K 10/02; B23P 15/00; C21D 9/00
  USPC ...................................... 219/121.63; 148/653
  See application file for complete search history.

(56) References Cited

U.S. PATENT DOCUMENTS

2020/0316668 A1* 10/2020 Shimizu ................ B23K 26/22
2021/0197525 A1   7/2021 Fujita et al.

FOREIGN PATENT DOCUMENTS

| | | |
|---|---|---|
| JP | 2014015206 A | 1/2014 |
| JP | 2015166099 A | 9/2015 |
| JP | 2016124029 A | 7/2016 |
| JP | 6642777 B1 | 2/2020 |
| JP | 2020168647 A | 10/2020 |

OTHER PUBLICATIONS

First Office Action for Chinese Patent Application No. 202110273730.9, dated Nov. 11, 2022, 16 pages.

\* cited by examiner

METHOD OF MANUFACTURING MOLDED PRODUCT AND MOLDED PRODUCT

CROSS-REFERENCE TO RELATED APPLICATIONS

This application claims the benefit of Japanese Patent Application No. 2020-044250 filed on Mar. 13, 2020 with the Japan Patent Office, the entire disclosure of which is incorporated herein by reference.

BACKGROUND

The present disclosure relates to a method of manufacturing a molded product and the molded product.

A method of obtaining a molded product by overlaying a reinforcing plate on a metal plate, which is a base material; welding the reinforcing plate with the metal plate; and pressing a portion of the metal plate overlaid with the reinforcing plate for drawing is publicly known (see Japanese Unexamined Patent Application Publication No. 2016-124029).

SUMMARY

In the method described above, if the position of the reinforcing plate with respect to the base material is offset during the pressing, then this problem of positional offset decreases the quality of the molded product. Such positional offset can be reduced by increasing a welding length of the reinforcing plate.

Nevertheless, hardness of the welded portion of the reinforcing plate increases by quenching performed during the welding, which decreases ductility of the welded portion. Accordingly, an increase in the welding length of the reinforcing plate may cause problems such as a breakage on the welded portion during the pressing.

One aspect of the present disclosure preferably provides a method of manufacturing a molded product that can reduce problems on the reinforcing plate during the pressing.

One aspect of the present disclosure is a method of manufacturing a molded product. The method includes welding a first metal plate overlaid with a second metal plate to the second metal plate; and pressing the first metal plate and the second metal plate together. In the pressing, a base surface and a wall surface are formed on the first metal plate. The wall surface is disposed to cross the base surface. In the welding, a first welding is performed on a reinforcing portion of the second metal plate that is overlaid on an area of the first metal plate that is formed into the wall surface; and subsequently, a second welding is performed in a direction crossing a direction of the first welding.

In the above configuration, by forming two welding beads that have welding directions crossing each other in the welding, at least one welding bead that has the welding direction crossing a pressing direction (that is, a drawing direction) is formed in an area that is to be pressed into a wall surface. Consequently, the tensile strength of the second metal plate at the overlaying portion can be increased without increasing the welding length, which can consequently reduce positional offset of the second metal plate with respect to the first metal plate. In other words, problems such as positional offset and a breakage of the second metal plate during the pressing, which is the reinforcing plate, can be reduced.

In one aspect of the present disclosure, a direction of the first welding and a direction of the second welding may be straight. This configuration reduces positional offset of the second metal plate while also reducing an increase in the welding length.

In one aspect of the present disclosure, in the pressing, a bottom surface and a curved portion may be further formed on the first metal plate. The bottom surface may be arranged opposite the base surface with respect to the wall surface and crosses the wall surface. The curved portion may couple the wall surface and the bottom surface to each other. A direction of the first welding may be parallel to a ridge line of the curved portion. A direction of the second welding may be orthogonal to the direction of the first welding. In this configuration, the welding bead formed in the first welding is orthogonal to the drawing direction, and therefore, the tensile strength of the second metal plate at the overlaying portion can be increased. This facilitates the effect of reducing positional offset of the second metal plate.

In one aspect of the present disclosure, in the welding, the first welding and the second welding may be performed with laser welding or plasma welding. This configuration can reduce welding strain and welding time.

Another aspect of the present disclosure is a molded product that includes a first metal plate including a base surface and a wall surface crossing the base surface; a second metal plate overlaid on and welded to at least the wall surface of the first metal plate; a first welding bead disposed on a reinforcing portion of the second metal plate, the reinforcing portion being overlaid on the wall surface of the first metal plate; and a second welding bead disposed on the reinforcing portion of the second metal plate. A welding direction of the first welding bead and a welding direction of the second welding bead cross each other.

This configuration reduces problems during pressing such as positional offset and a breakage of the second metal plate, which is the reinforcing plate.

In one aspect of the present disclosure, the first welding bead and the second welding bead may be formed linearly. This configuration can reduce positional offset of the second metal plate while reducing an increase in the welding length.

In one aspect of the present disclosure, the first metal plate may further include a bottom surface and a curved portion. The bottom surface may be arranged opposite the base surface with respect to the wall surface and crosses the wall surface. The curved portion may couple the wall surface and the bottom surface to each other. The welding direction of the first welding bead may be parallel to a ridge line of the curved portion. The welding direction of the second welding bead may be orthogonal to the welding direction of the first welding bead. This configuration enables an easy and accurate welding that reduces positional offset of the second metal plate.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

1. First Embodiment

[1-1. Configuration]

Figure 1:
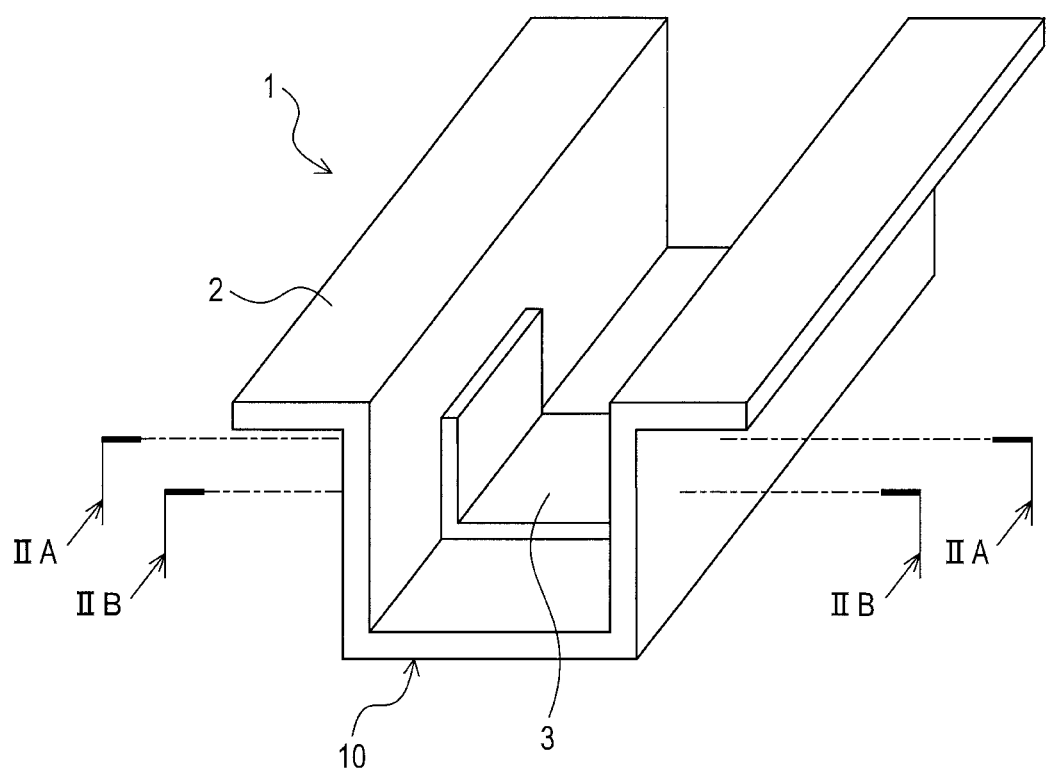
FIG. 1 is a schematic perspective view of a molded product in an embodiment.

A molded product 1 shown in FIG. 1 is formed by pressing a blank material prepared by overlaying a second metal plate 3 on a first metal plate 2.

Materials of the first metal plate 2 and the second metal plate 3 are not particularly limited, but an aluminum-plated iron plate is illustrated as an example. Thicknesses of the first metal plate 2 and the second metal plate 3 are also not particularly limited, but, for example, metal plates having thicknesses from 1 mm or greater to 3 mm or less can be preferably used. It should be noted that the thicknesses of the first metal plate 2 and the second metal plate 3 may be different from each other.

The molded product 1 is used as a component of automobile bodies, such as reinforcements, structural members, pillars, and panels.

The molded product 1 includes a protruding ridge 10. The protruding ridge 10 is formed by pressing and drawing the blank material in its thickness direction.

Figure 2A:
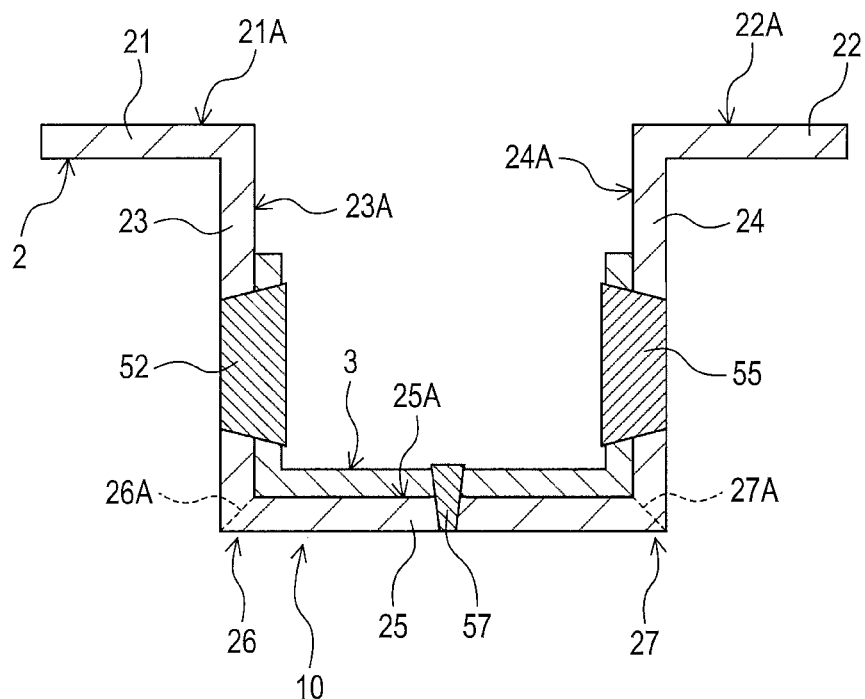
FIG. 2A is a schematic cross-sectional view taken along line IIA-IIA on FIG. 1.
Figure 2B:
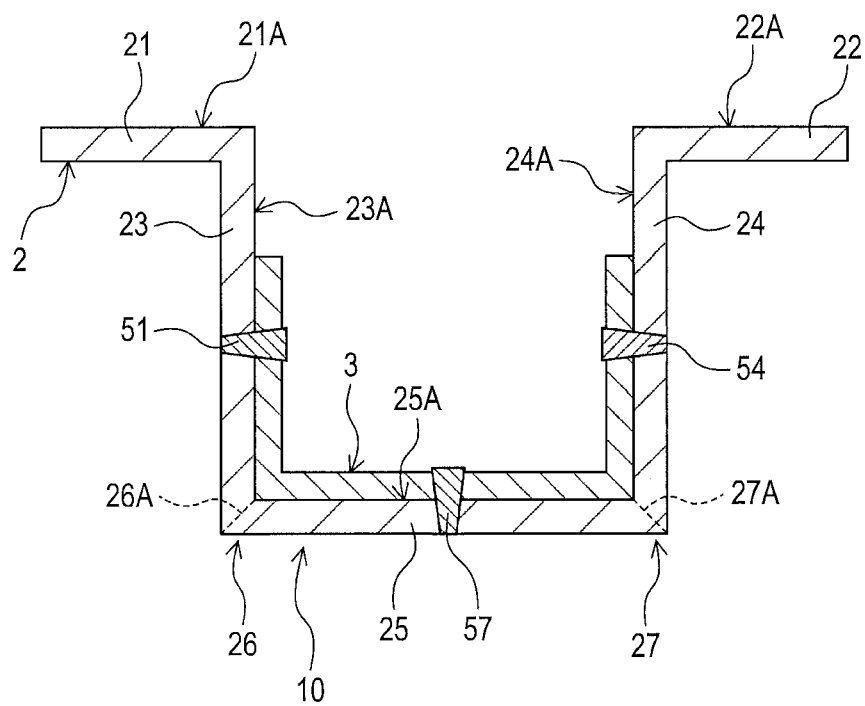
FIG. 2B is a schematic cross-sectional view taken along line IIB-IIB on FIG. 1.

As shown in FIG. 2A and FIG. 2B, the first metal plate 2 includes a first end 21, a second end 22, a first side wall 23, a second side wall 24, a bottom wall 25, a first curved portion 26, and a second curved portion 27.

The first end 21 and the second end 22 are arranged to interpose the protruding ridge 10 between each other. The first side wall 23, the second side wall 24, and the bottom wall 25 together form the protruding ridge 10. The first side wall 23 and the second side wall 24 are disposed to face each other and coupled to each other via the bottom wall 25.

A first base surface 21A is a plate surface of the first end 21 and is parallel to a second base surface 22A, which is a plate surface of the second end 22. A first wall surface 23 is a plate surface of the first side wall 23 and crosses (placed orthogonally to, in the present embodiment) the first base surface 21A and a bottom surface 25A, which is a plate surface of the bottom wall 25. A second wall surface 24A is a plate surface of the second side wall 24 and crosses (placed orthogonally to, in the present embodiment) the second base surface 22A and the bottom surface 25A.

The bottom surface 25A is arranged opposite the first base surface 21A with respect to the first wall surface 23A. The first curved portion 26 couples the first wall surface 23A with the bottom surface 25A. The second curved portion 27 couples the second wall surface 24A and the bottom surface 25A.

The second metal plate 3 is overlaid on and welded to the first metal plate 2. The second metal plate 3 forms a portion of an inner surface of the protruding ridge 10. As shown in FIG. 2A and FIG. 2B, the second metal plate 3 that forms an inner side of the protruding ridge 10 is bent along the first side wall 23, the bottom wall 25, and the second side wall 24 of the first metal plate 2.

Figure 3:
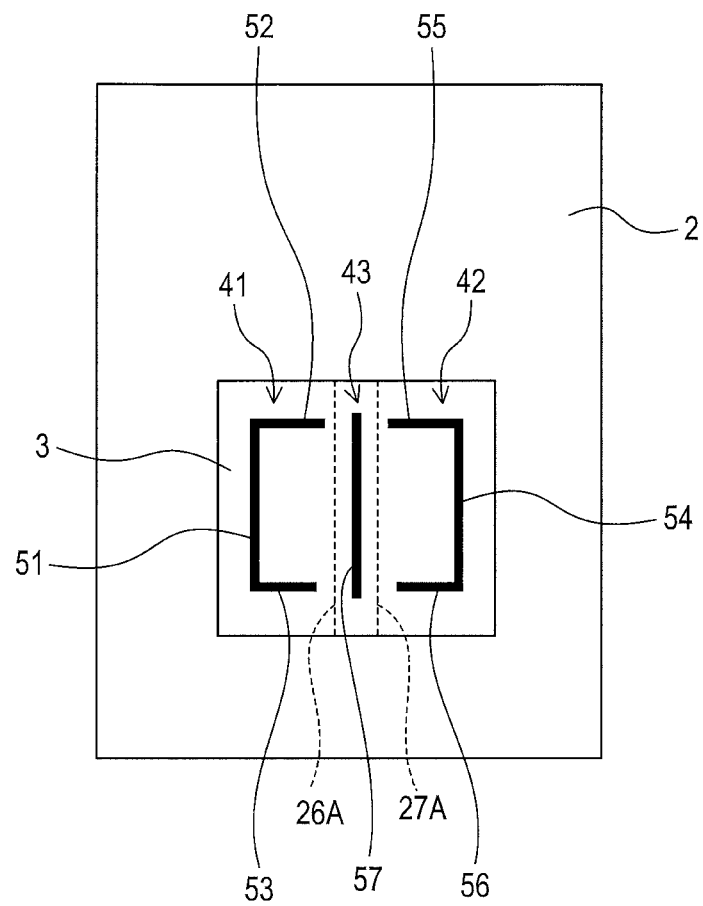
FIG. 3 is a schematic plane view of a blank material after undergoing welding.

As shown in FIG. 3, the molded product 1 includes a first welding bead 51, a second welding bead 52, a third welding bead 53, a fourth welding bead 54, a fifth welding bead 55, a sixth welding bead 56, and a seventh welding bead 57 that join the second metal plate 3 to the first metal plate 2. FIG. 3 shows the blank material that is not yet pressed into the molded product 1.

Each welding bead penetrates the first metal plate 2 and the second metal plate 3. In other words, in each welding bead, a portion of the second metal plate 3 melts through the first metal plate 2 to a surface on the other side of the first metal plate 2 opposite the second metal plate 3.

The first welding bead 51, the second welding bead 52, and the third welding bead 53 are formed on a first reinforcing portion 41 of the second metal plate 3 overlaid on the first wall surface 23A of the first metal plate 2.

A welding direction of the first welding bead 51 (that is a direction of a first welding that forms the first welding bead 51, as well as an extending direction of the first welding bead 51) crosses a welding direction of the second welding bead 52 (that is a direction of a second welding that forms the second welding bead 52, as well as an extending direction of the second welding bead 52). The welding direction of the first welding bead 51 also crosses a welding direction of the third welding bead 53 (that is a direction of a third welding that forms the third welding bead 53, as well as an extending direction of the third welding bead 53).

Each of the first welding bead 51, the second welding bead 52, and the third welding bead 53 is formed linearly. In other words, each of the directions of the first welding, the second welding, and the third welding is straight.

The welding direction of the first welding bead 51 is parallel to a ridge line 26A of the first curved portion 26. The first welding bead 51 is disposed near an end portion of the second metal plate 3 opposite the bottom surface 25A.

The welding directions of the second welding bead 52 and the third welding bead 53 are both orthogonal to the welding direction of the first welding bead 51. The second welding bead 52 extends from one end of the first welding bead 51 towards the bottom surface 25A. The third welding bead 53 extends from the other end of the first welding bead 51 towards the bottom surface 25A.

The second welding bead 52 and the third welding bead 53 do not overlap the ridge line 26A of the first curved portion 26. In other words, the second welding bead 52 and the third welding bead 53 are disposed only within the first reinforcing portion 41.

The fourth welding bead 54, the fifth welding bead 55, and the sixth welding bead 56 are formed on a second reinforcing portion 42 of the second metal plate 3 overlaid on the second wall surface 24A of the first metal plate 2.

A welding direction of the fourth welding bead 54 crosses a welding direction of the fifth welding bead 55. The welding direction of the fourth welding bead 54 also crosses a welding direction of the sixth welding bead 56. Each of the fourth welding bead 54, the fifth welding bead 55, and the sixth welding bead 56 is formed linearly.

The welding direction of the fourth welding bead 54 is parallel to a ridge line 27A of the second curved portion 27. The fourth welding bead 54 is disposed near an end portion of the second metal plate 3 opposite the bottom surface 25A.

The welding directions of the fifth welding bead 55 and the sixth welding bead 56 are both orthogonal to the welding direction of the fourth welding bead 54. The fifth welding bead 55 extends from one end of the fourth welding bead 54 towards the bottom surface 25A. The sixth welding bead 56 extends from the other end of the fourth welding bead 54 towards the bottom surface 25A.

The fifth welding bead 55 and the sixth welding bead 56 do not overlap the ridge line 27A of the second curved portion 27. In other words, the fifth welding bead 55 and the sixth welding bead 56 are disposed only within the second reinforcing portion 42.

The seventh welding bead 57 is formed on a third reinforcing portion 43 of the second metal plate 3 overlaid on the bottom surface 25A of the first metal plate 2. The seventh welding bead 57 is formed linearly. The welding direction of the seventh welding bead 57 is parallel to the ridge line 26A of the first curved portion 26 and the ridge line 27A of the second curved portion 27. The seventh welding bead 57 is disposed between the first curved portion 26 and the second curved portion 27.

[1-2. Method of Manufacturing]

Figure 4:
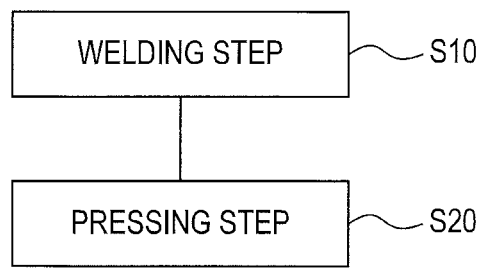
FIG. 4 is a flow chart of a method of manufacturing a molded product in an embodiment.

A method of manufacturing a molded product shown in FIG. 4 is a method to produce the molded product 1 in FIG. 1. In the present embodiment, a method of manufacturing a molded product includes a welding step S10 and a pressing step S20.

<Welding Step>

In the welding step, the second metal plate 3 is overlaid on and welded to the first metal plate 2. More specifically, an unpressed second metal plate 3 is overlaid on an unpressed first metal plate 2 so as to cover portions of the unpressed first metal plate 2 that are to be formed into the first wall surface 23A, the bottom surface 25A, and the second wall surface 24A.

As shown in FIG. 3, with the second metal plate 3 overlaid on the first metal plate 2, the first welding is performed on the first reinforcing portion 41 to form the first welding bead 51 followed by the second welding to form the second welding bead 52, and a third welding to form the third welding bead 53. In addition, the fourth welding bead 54, the fifth welding bead 55, and the sixth welding bead 56 are formed on the second reinforcing portion 42. Then, the seventh welding bead 57 is formed on the third reinforcing portion 43.

Each welding bead may be formed by welding techniques such as laser welding, plasma welding, arc welding, seam welding, hybrid welding, and adhesive welding. Among these, a preferable welding method is laser welding or plasma welding that can reduce welding strain and welding time.

In laser welding, lasers with various wavelengths can be used, for example, a fiber laser, a $CO_2$ laser, a blue laser, and a green laser. In plasma welding, an electron beam can be used for example.

<Pressing Step>

In the pressing step, the molded product 1 that includes the protruding ridge 10 is obtained by pressing the first metal plate 2 with the second metal plate 3.

Specifically, the blank material obtained in the welding step S10 is hot-pressed (hot-stamped) to form the protruding ridge 10. The protruding ridge 10 may also be formed by cold-press if it suits the materials of the first metal plate 2 and the second metal plate 3.

Accordingly, the first wall surface 23A, the second wall surface 24A, the bottom surface 25A, the first curved portion 26, and the second curved portion 27 are formed by drawing the first metal plate 2 by the pressing. The second metal plate 3 is also bent along the first wall surface 23A and the second wall surface 24A.

[1-3. Effects]

The first embodiment that has been explained above in detail renders the following effects.

(1a) By forming two welding beads that have the welding directions crossing each other in the welding step S10, at least one welding bead that has the welding direction crossing a pressing direction (that is, a drawing direction) is formed in an area that is to be pressed into the first wall surface 23A. Consequently, the tensile strength of the reinforcing portions 41 and 42 is increased without increasing the welding lengths, which can consequently reduce positional offset of the second metal plate 3 with respect to the first metal plate 2. In other words, problems during pressing such as positional offset and a breakage of the second metal plate 3, which is the reinforcing plate, can be reduced.

In addition, in the first embodiment, the presence of the third welding bead 53 effectively reduces positional offset of the second metal plate 3 on the first wall surface 23A. Furthermore, the fourth welding bead 54, the fifth welding bead 55, and the sixth welding bead 56 reduce positional offset of the second metal plate 3 on the second wall surface 24A.

(1b) The first welding bead 51, the second welding bead 52, the third welding bead 53, the fourth welding bead 54, the fifth welding bead 55, and the sixth welding bead 56 are each formed linearly. This reduces positional offset of the second metal plate 3 while also reducing an increase in the welding lengths.

(1c) The welding direction of the first welding bead 51 is parallel to the ridge line 26A of the first curved portion 26, and the welding directions of the first welding bead 51 and the second welding bead 52 are orthogonal to each other. Such configuration helps increase the tensile strength of the reinforcing portions 41 and 42 by the first welding bead 51 that is orthogonal to the drawing direction. This facilitates the effect of reducing positional offset of the second metal plate 3.

2. Other Embodiments

The first embodiment of the present disclosure has been explained. Nevertheless, the present disclosure is not limited to the aforementioned embodiment but may be embodied in various other forms.

(2a) In the method of manufacturing the molded product described in the first embodiment, the welding direction of the first welding bead 51 does not necessarily have to be parallel to the ridge line 26A of the first curved portion 26. In addition, the welding direction of the second welding bead 52 does not necessarily have to be orthogonal to the welding direction of the first welding bead 51.

Figure 5:
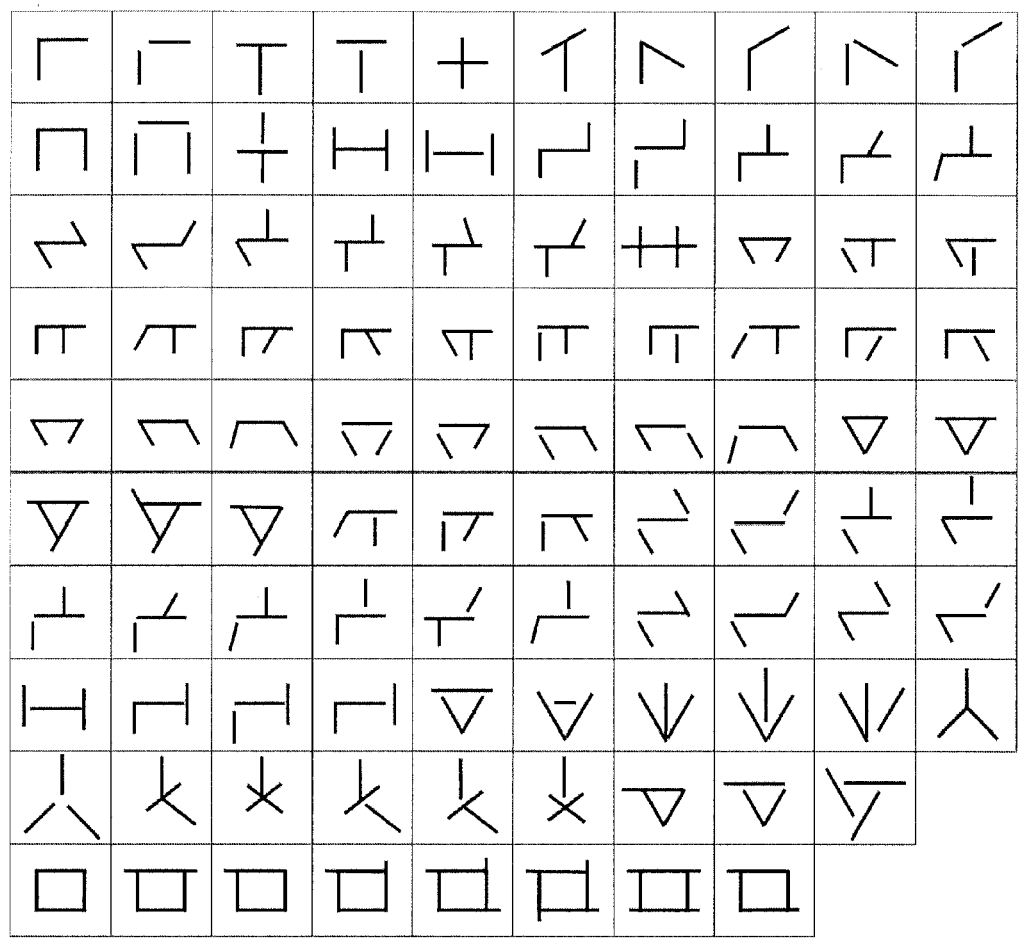
FIG. 5 is a schematic diagram showing shape patterns of welding beads in an embodiment different from the embodiment of FIG. 4.

(2b) The shape of the welding beads described in the method of manufacturing the molded product in the first embodiment is simply an example. For example, the shapes of the welding beads shown in FIG. 5 can be applied in the present disclosure. Different shape patterns of the welding beads that can be formed on the reinforcing portions 41 and 42 are illustrated in the boxes in FIG. 5. As shown in FIG. 5, the number of welding beads formed in the welding step may be two, and four or more. In addition, a welding bead that is not coupled to other welding bead (in other words, arranged separately from other bead) may be formed.

(2c) In the method of manufacturing the molded product in the first embodiment, each welding bead does not necessarily have to be formed linearly. For example, at least one of the first welding bead 51 or the second welding bead 52 may be curved.

(2d) In the method of manufacturing the molded product in the first embodiment, each welding bead does not necessarily have to penetrate the first metal plate 2 and the second metal plate 3.

(2e) In the method of manufacturing the molded product in the first embodiment, the second metal plate 3 may form a portion of an outer surface of the protruding ridge 10. In other words, the second metal plate 3 may be overlaid on the outer surface of the first metal plate 2 at the protruding ridge 10.

(2f) Functions of one element in the aforementioned embodiments may be achieved by two or more elements. Functions of two or more elements may be integrated into one element. A part of the configuration in the aforementioned embodiments may be omitted. At least a part of the configuration in the aforementioned embodiments may be added to or replaced with other part of the configuration in the aforementioned embodiments. It should be noted that any and all modes included in the technical ideas that are identified by the languages recited in the claims are embodiments of the present disclosure.

What is claimed is:

1. A method of manufacturing a molded product, the method comprising:
   welding a first metal plate overlaid with a second metal plate to the second metal plate; and
   pressing the first metal plate and the second metal plate together,
   wherein, in the pressing, a first base surface, a first wall surface, a bottom surface, and a first curved portion are formed on the first metal plate, the first wall surface being disposed to cross the first base surface, the bottom surface being arranged opposite the first base surface with respect to the first wall surface and crossing the first wall surface, and the first curved portion coupling the first wall surface and the bottom surface to each other,
   wherein, in the welding, a first welding is performed on a first reinforcing portion of the second metal plate that is overlaid on an area of the first metal plate that is formed into the first wall surface; and subsequently, a second welding in a direction crossing a direction of the first welding and a third welding in a direction parallel to the direction of the second welding are performed on the first reinforcing portion, and only a supplemental welding is performed on a supplemental reinforcing portion of the second metal plate that is overlaid on an area of the first metal plate that is formed into the bottom surface, the supplemental welding being performed in a direction parallel to a ridge line of the first curved portion,
   wherein the direction of the first welding and the direction of the second welding are straight,
   wherein the first welding and the second welding do not reach the supplemental reinforcement portion,
   wherein the supplemental welding is performed positionally separated from the first welding and the second welding,
   wherein the second welding extends from one end of the first welding,
   wherein the third welding extends from an other end of the first welding that opposes the one end, and
   wherein, on the first reinforcing portion, only the first welding, the second welding, and the third welding are performed.

2. The method of manufacturing the molded product according to claim 1,
   wherein the direction of the first welding is parallel to the ridge line of the first curved portion, and
   wherein the direction of the second welding is orthogonal to the direction of the first welding.

3. The method of manufacturing the molded product according to claim 1,
   wherein, in the welding, the first welding and the second welding are performed with laser welding or plasma welding.

4. A molded product comprising:
   a first metal plate including a first base surface, a first wall surface crossing the first base surface, a bottom surface arranged opposite the first base surface with respect to the first wall surface and crossing the first wall surface, and a first curved portion coupling the first wall surface and the bottom surface to each other;
   a second metal plate overlaid on and welded to at least the first wall surface of the first metal plate;
   a first welding bead disposed on a first reinforcing portion of the second metal plate, the first reinforcing portion being overlaid on the first wall surface of the first metal plate;
   a second welding bead disposed on the first reinforcing portion of the second metal plate;
   a third welding bead disposed on the first reinforcing portion of the second metal plate; and
   a supplemental welding bead disposed on a supplemental reinforcing portion of the second metal plate, the supplemental reinforcing portion being overlaid on the bottom surface of the first metal plate,
   wherein a welding direction of the first welding bead and a welding direction of the second welding bead cross each other,
   wherein the first welding bead and the second welding bead are formed linearly,
   wherein the first welding bead and the second welding bead do not reach the supplemental reinforcing portion,
   wherein a welding direction of the supplemental welding bead is parallel to a ridge line of the first curved portion,
   wherein the supplemental welding bead is separated from the first welding bead and the second welding bead,
   wherein only the supplemental welding bead is disposed on the supplemental reinforcing portion,
   wherein a welding direction of the third welding bead is parallel to the welding direction of the second welding bead,
   wherein the second welding bead extends from one end of the first welding bead,
   wherein the third welding bead extends from an other end of the first welding that opposes the one end, and
   wherein only the first welding bead, the second welding bead, and the third welding bead are disposed on the first reinforcing portion.

5. The molded product according to claim 4,
   wherein the welding direction of the first welding bead is parallel to the ridge line of the first curved portion, and
   wherein the welding direction of the second welding bead is orthogonal to the welding direction of the first welding bead.

* * * * *